Patented July 22, 1941

2,249,795

UNITED STATES PATENT OFFICE 2,249,795

AQUEOUS UREA-FORMALDEHYDE COATING COMPOSITIONS

Erich Theis, Mannheim, Germany

No Drawing. Application October 21, 1937, Serial No. 170,220. In Germany October 22, 1936

1 Claim. (Cl. 260—29)

The present invention relates to improved coating agents.

I have found that for use as oil-free, weatherproof binding agents for coatings the condensation products are eminently suitable which are obtained by condensing a urea, which term includes besides urea itself also thiourea and mixtures of the same, with aldehydes, in particular formaldehyde, in aqueous solution with or without the use of condensing agents while using from 1 to 2½ molecular proportions of aldehyde to 1 molecular proportion of urea employed for such a period at elevated temperature, preferably while boiling, that the condensing solution becomes strongly cloudy.

The coating agents prepared with the said binding agents yield on wood, plaster, stone or other substrata of a non-metallic nature entirely weatherproof coatings of extremely high adhesive power. Since at the same time the said coatings are porous, no "sweating" of the surfaces occurs when they are used in internal chambers of high moisture content in the air. A further advantage of the said binding agent consists in many cases in the fact that the color pigment appears with higher luminosity than when using other binding agents. The new coating color is very strong and has high covering power, it is easily applied and dries in a very short time.

The use of homogeneous solutions of the condensation products of urea and formaldehyde for coating and lacquer purposes is known per se, but cloudy condensation products have not hitherto been used. The fact that the latter are most suitable as oil-free, weatherproof binding agents for coating is highly surprising since it was to be expected that the fastness to weather would be impaired by the use of the inhomogeneous cloudy condensation products compared with the homogeneous products. The contrary, however, occurs.

The following example will further illustrate how my said invention may be carried out in practice but the invention is not restricted to this example. The parts are by weight.

Example 600 parts of urea and 1500 parts of neutralized 30 per cent aqueous formaldehyde are heated in a stirring vessel with a reflux condenser for 70 minutes at the boiling point. The reaction mixture then clouded by a white precipitate is cooled and the hydrogen ion concentration of the binding agent, which is now finished, adjusted to a pH value of 7.

To prepare a painting color, the binding agent is stirred with color pigments. Water may also be added. In order to harden the coating, the coating color has added to it shortly before use one of the known hardening agents, in particular an acid, an acid salt or a substance splitting off acid. The operation may, for example, be as follows:

(a) 75 parts of the binding agent are stirred with 50 parts of lithopone and 5 parts of concentrated formic acid are added.

(b) 300 parts of the binding agent have 100 parts of water added thereto and are then mixed with 375 parts of a mixture of lithopone, iron oxide yellow and umber. 30 parts of a concentrated aqueous solution of ammonium sulphate are added as a hardening agent.

What I claim is:

Coating compositions containing water as the sole liquid vehicle and containing a condensation product as an oil-free, weather-proof binding agent therefor, said condensation product being obtained by the method consisting in condensing at elevated temperature in aqueous solution one molecular proportion of a urea with one and a half molecular proportions of neutralized formaldehyde until the condensation solution becomes strongly cloudy and adjusting the pH value of the solution to pH 7.

ERICH THEIS.